US012015967B2

(12) United States Patent
Navratil et al.

(10) Patent No.: US 12,015,967 B2
(45) Date of Patent: Jun. 18, 2024

(54) METHOD, SYSTEM AND APPARATUS FOR MULTICAST SESSION MANAGEMENT IN 5G COMMUNICATION NETWORK

(71) Applicant: Nokia Solutions and Networks Oy, Espoo (FI)

(72) Inventors: David Navratil, Helsinki (FI); Pekka Korja, Kauniainen (FI); Athul Prasad, Helsinki (FI); Mikko Säily, Laukkoski (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/772,085

(22) PCT Filed: Dec. 12, 2017

(86) PCT No.: PCT/EP2017/082478
§ 371 (c)(1),
(2) Date: Jun. 11, 2020

(87) PCT Pub. No.: WO2019/114938
PCT Pub. Date: Jun. 20, 2019

(65) Prior Publication Data
US 2021/0076166 A1    Mar. 11, 2021

(51) Int. Cl.
*H04W 12/06*    (2021.01)
*H04L 67/141*    (2022.01)
*H04W 4/08*    (2009.01)

(52) U.S. Cl.
CPC ............. *H04W 4/08* (2013.01); *H04L 67/141* (2013.01)

(58) Field of Classification Search
None
See application file for complete search history.

(56) References Cited

U.S. PATENT DOCUMENTS

2006/0171369 A1    8/2006 Ostrup et al.
2014/0313974 A1*  10/2014 Chandramouli ........ H04W 4/06
                                                              370/328
(Continued)

FOREIGN PATENT DOCUMENTS

WO    WO-2008093208 A1 *  8/2008 ........... H04L 12/189
WO    WO-2008107778 A1    9/2008

OTHER PUBLICATIONS

3rd Generation Partnership Project; Technical Specification Group Services and System Aspects; Multimedia Broadcast/Multicast Service (MBMS); Architecture and functional description (Release 14); 3GPP TS 23.246 V14.2.0 (Sep. 2017) (76 pages).

(Continued)

*Primary Examiner* — Natisha D Cox
(74) *Attorney, Agent, or Firm* — Mintz Levin Cohn Ferris Glovsky and Popeo, P.C.

(57) ABSTRACT

An apparatus comprising at least one processor and at least one memory including computer code for one or more programs, the at least one memory and the computer code configured, with the at least one processor, to cause the apparatus at least to: receive a message from at least one user equipment requesting to join a multicasting/broadcasting group; receive data for multicasting/broadcasting from a data network; generate multicasting/broadcasting session information for the data; route the data based on the multicasting/broadcasting session to at least one access point, wherein the access point wirelessly communicates the data to user equipment based on the multicasting/broadcasting session information.

17 Claims, 6 Drawing Sheets

(56) References Cited

U.S. PATENT DOCUMENTS

| | | | | |
|---|---|---|---|---|
| 2018/0123812 | A1* | 5/2018 | Hu | H04W 88/16 |
| 2018/0192289 | A1* | 7/2018 | Dao | H04W 12/03 |
| 2019/0158985 | A1* | 5/2019 | Dao | H04W 28/04 |
| 2020/0267513 | A1* | 8/2020 | Zhu | H04L 65/1033 |
| 2020/0323024 | A1* | 10/2020 | Huang | H04W 4/06 |
| 2021/0058748 | A1* | 2/2021 | Liao | H04W 76/11 |

OTHER PUBLICATIONS

3rd Generation Partnership Project; Technical Specification Group Services and System Aspects; System Architecture for the 5G System; Stage 2; (Release 15), 3GPP TS 23.501 v1.4.0 (Sep. 2017). (151 pages).

3rd Generation Partnership Project; Technical Specification Group Services and System Aspects; Procedures for the 5G System; Stage 2; (Release 15), 3GPP TS 23.502 v1.2.0 (Sep. 2017). (165 pages).

3rd Generation Partnership Project; Technical Specification Group Core Network and Terminals; GPRS Tunnelling Protocol (GTP) specification for Gateway Location Register (GLR); (Release 14), 3GPP TS 29.119 v14.0.0 (Mar. 2017). (11 pages).

3rd Generation Partnership Project; Technical Specification Group Core Network and Terminals; Group Communication System Enablers for LTE (GCSE_LTE); MB2 Reference Point; Stage 3 (Release 15) 3GPP TS 29.468 v15.1.0 (Sep. 2017) (38 pages).

* cited by examiner

METHOD, SYSTEM AND APPARATUS FOR MULTICAST SESSION MANAGEMENT IN 5G COMMUNICATION NETWORK

This application is a national phase entry of Patent Cooperation Treaty Application No. PCT/EP2017/082478 filed Dec. 12, 2017, entitled "METHOD, SYSTEM AND APPARATUS FOR MULTICAST SESSION MANAGEMENT IN 5G COMMUNICATION NETWORK," the disclosure of which is incorporated herein by reference in its entirety.

FIELD

The present application relates to a method, apparatus, system and computer program and in particular but not exclusively to a method and apparatus for multicast session management in a 5G New Radio communications network.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio), long-term evolution (LTE) of the Universal Mobile Telecommunications System (UMTS), and now 5G New Radio (NR) radio-access technology with 5G Core Network (5GC). 5G NR is being standardized by the 3rd Generation Partnership Project (3GPP).

Multicast and broadcast in cellular networks is an area of discussion. Multicast session definition and management architecture for delivering content using multicast/broadcast in LTE-Advanced networks are known. Here wide-area delivery of content using multicast/broadcast is implemented using multicast broadcast single frequency networks (MBSFN) areas where the same content is delivered over the air using synchronized time-frequency physical resources. For delivery of such content to a smaller area, single cell-point-to-multipoint (SC-PTM) technology was developed.

SUMMARY

According to an aspect, there is provided an apparatus comprising at least one processor and at least one memory including computer code for one or more programs, the at least one memory and the computer code configured, with the at least one processor, to cause the apparatus at least to: receive a message from at least one user equipment requesting to join a multicasting/broadcasting group; receive data for multicasting/broadcasting from a data network; generate multicasting/broadcasting session information for the data; route the data based on the multicasting/broadcasting session to at least one access point, wherein the access point wirelessly communicates the data to user equipment based on the multicasting/broadcasting session information.

The apparatus may be a user plane function within a 5G/NR network.

The apparatus may be further caused to: generate a multicast session notification message to a session management function based on the message from the at least one user equipment; receive a multicast session creation request from the session management function based on the multicast session notification message; and create and acknowledge the creation of a multicast session based on the multicast session creation request.

The apparatus caused to generate a multicast session notification message to a session management function based on the message from the at least one user equipment may be further caused to generate a multicast session notification message comprising at least one of: a packet data unit session identifier configured to indicate the session on which the message from at least one user equipment was received and for identifying the at least one user equipment; at least one internet protocol multicast address; at least one internet protocol source address; and tunnel end-point information.

The apparatus caused to route the data based on the multicasting/broadcasting session to at least one access point, wherein the access point wirelessly communicates the data to user equipment based on the multicasting/broadcasting session information may be caused to implement a multicasting routing protocol to route the data from the data network to the at least one access point.

The apparatus caused to receive a message from at least one user equipment requesting to join a multicasting/broadcasting group is caused to receive a message may comprise at least one of: at least one internet protocol multicast address; and at least one internet protocol source address.

The apparatus may be further caused to: transmit a message to at least one session management function notifying the session management function of the request from the at least one user equipment to join the multicasting/broadcasting group and to perform a subscription check on the request to determine whether the request matches an active session; and receive, based on the subscription check failing to match the request to an active session, a multicasting session creation message, wherein the apparatus caused to generate multicasting/broadcasting session information for the data may be caused to generate multicasting/broadcasting session information for data to be multicast to the at least one user equipment based on the multicasting session creation message.

The apparatus may be further caused to receive based on the subscription check succeeding to match the request to an active session, a multicasting session message comprising an identifier for active multicasting/broadcasting session information, wherein the apparatus caused to generate multicasting/broadcasting session information for the data may be caused to update multicasting/broadcasting session information for data to be multicast to the at least one user equipment based on the active multicasting/broadcasting session information.

The apparatus caused to generate multicasting/broadcasting session information for the data may be further caused to generate multicasting/broadcasting session information for the data comprising at least one of: a packet data unit session identifier; at least one internet protocol multicast address; at least one internet protocol source address; and tunnel end-point information.

According to a second aspect there is provided an apparatus comprising at least one processor and at least one memory including computer code for one or more programs, the at least one memory and the computer code configured, with the at least one processor, to cause the apparatus at least to: receive a message from at least one user plane function notifying the apparatus of a request from at least one user equipment to join a multicasting/broadcasting group; perform a subscription check on the request to determine whether the request matches an active session; transmit, based on the subscription check failing to match the request to an active session, a multicasting session creation message to the at least one user plane function, such that the user plane function is caused to generate multicasting/broadcasting session information for data to be multicast to the at least one user equipment.

The apparatus caused to transmit, based on the subscription check failing to match the request to an active session, a multicasting session creation message to the at least one user plane function may be caused to transmit information comprising at least one of: packet detection rules; packet enforcement rules; packet reporting rules; packet quality of service rules; and packet charging rules, for the user plane function to implement with respect to the multicasting/broadcasting session.

The apparatus may be further caused to transmit based on the subscription check succeeding to match the request to an active session, a multicasting session message to the at least one user plane function, such that the user plane function identifies the active multicasting/broadcasting session information for data to be multicast to the at least one user equipment.

The apparatus may be further caused to: transmit a network management message associated with the multicast session, the network management message comprising at least one of: session management information to be forwarded at an access and mobility management function to the at least one access network node and the at least one user equipment.

The apparatus caused to transmit network management message associated with the multicast session may be caused to transmit at least one of: a cause value; session management information for an interface between the apparatus and an access network node, the session management information for an interlace between the apparatus and the access network node comprising at least one of: a multicast packet data unit identifier, a session identifier, at least one quality of service profile, core network tunnel information, a single network slice selection assistance information, and session-AMBR information; session management information for an interface between the at least one user equipment and the apparatus, the session management information of an interlace between the at least one user equipment and the apparatus comprising at least one of the a multicast packet data unit identifier, a session identifier, at least one quality of service profile, and session-AMBR information.

The apparatus may be further caused to receive, from the at least one user plane function, generated multicasting/broadcasting session creation information and which is used to generate the network management message associated with the multicast session.

The apparatus may be a session management function within a 5G/NR network.

According to a third aspect there is provided an apparatus comprising at least one processor and at least one memory including computer code for one or more programs, the at least one memory and the computer code configured, with the at least one processor, to cause the apparatus at least to: receive from an access and mobility management function a multicast session creation request message; receive from a user plane function data for multicasting/broadcasting from a data network; select for the data a set of radio bearers based on an availability of measurements and reported quantities in the measurements from at least one user equipment; and transmit using the set of radio bearers the data for multicasting/broadcasting to the at least one user equipment, the at least one user equipment having requested to join a multicasting/broadcasting group associated with the data for multicasting/broadcasting.

The apparatus caused to receive the multicast session request message may be further caused to receive within the multicast session request message information associating at least one user equipment with the multicast session request.

The apparatus caused to select for the data a set of radio bearers based on an availability of the measurements and reported quantities in the measurements from the at least one user equipment may be caused to: receive from the at least one user equipment the measurements of at least one parameter of: a received signal strength indicator—RSSI; a reference signal received power—RSRP; a reference signal received quality—RSRQ; a block error rate—BLER, and beam information, location information and time information; and select at least one multicast radio bearer and/or at least one unicast radio bearer based on the at least one parameter.

The apparatus caused to select for the data a set of radio bearers based on the availability of measurements and reported quantities in the measurements from at least one user equipment may be caused to select at least one multicast bearer where no measurements are available.

The apparatus caused to select for the data a set of radio bearers based on the availability of measurements and reported quantities in the measurements from at least one user equipment may be caused to select at least one unicast bearer for the at least one user equipment where the measurements indicate a worse radio condition.

The apparatus may be further caused to select for the data the set of radio bearers further based on a determination of the type of data for multicasting/broadcasting to the at least one user equipment.

The apparatus may be at least one of: a gNB; and a relay node operating within a 5G/NR radio access network.

The apparatus caused to receive from an access and mobility management function a multicast session creation request message may be further caused to receive information comprising at least one of: packet detection rules; packet enforcement rules; packet reporting rules; packet quality of service rules; and packet charging rules, for the apparatus to implement with respect to the multicasting/broadcasting session.

According to a fourth aspect there is provided an apparatus comprising at least one processor and at least one memory including computer code for one or more programs, the at least one memory and the computer code configured, with the at least one processor, to cause the apparatus at least to: transmit a message from at least one user equipment requesting to join a multicasting/broadcasting group; receive from an access point via at least one of a selected unicast bearer or a multicast bearer data for multicasting/broadcasting from a data network associated with the multicasting/broadcasting group.

The apparatus may be further caused to: measure at least one parameter of: a received signal strength indicator—RSSI; a reference signal received power—RSRP; a reference signal received quality—RSRQ; a block error rate—BLER; beam information; location information; and time information; and transmit the at least one parameter to at least one access point of a radio access network, wherein the at least one parameter is caused to enable the at least one access point to select the at least one of the unicast or multicast bearer.

The apparatus caused to transmit a message from at least one user equipment requesting to join a multicasting/broadcasting group may be caused to transmit a message comprising at least one of: at least one internet protocol multicast address; and at least one internet protocol source address.

The apparatus may be further caused to: receive a session management information; and determine, based on the received session management information, whether to repeat the request to join a multicast/broadcast group or not to repeat the request to join a multicast/broadcast group.

According to a fifth aspect there is provided a method comprising: receiving a message from at least one user equipment requesting to join a multicasting/broadcasting group; receiving data for multicasting/broadcasting from a data network; generating multicasting/broadcasting session information for the data; routing the data based on the multicasting/broadcasting session to at least one access point, wherein the access point wirelessly communicates the data to user equipment based on the multicasting/broadcasting session information.

The method may be implemented within a user plane function within a 5G/NR network.

The method may further comprise: generating a multicast session notification message to a session management function based on the message from the at least one user equipment; receiving a multicast session creation request from the session management function based on the multicast session notification message; and creating and acknowledging the creation of a multicast session based on the multicast session creation request.

Generating a multicast session notification message to a session management function based on the message from the at least one user equipment may further comprise generating a multicast session notification message comprising at least one of: a packet data unit session identifier configured to indicate the session on which the message from at least one user equipment was received and for identifying the at least one user equipment; at least one internet protocol multicast address; at least one internet protocol source address; and tunnel end-point information.

Routing the data based on the multicasting/broadcasting session to at least one access point, wherein the access point wirelessly communicates the data to user equipment based on the multicasting/broadcasting session information may further comprise implementing a multicasting routing protocol to route the data from the data network to the at least one access point.

Receiving a message from at least one user equipment requesting to join a multicasting/broadcasting group may further comprise receiving a message comprising at least one of: at least one internet protocol multicast address; and at least one internet protocol source address.

The method may further comprise: transmitting a message to at least one session management function notifying the session management function of the request from the at least one user equipment to join the multicasting/broadcasting group and to perform a subscription check on the request to determine whether the request matches an active session; and receiving, based on the subscription check failing to match the request to an active session, a multicasting session creation message, wherein generating multicasting/broadcasting session information for the data may further comprise generating multicasting/broadcasting session information for data to be multicast to the at least one user equipment based on the multicasting session creation message.

The method may further comprise receiving, based on the subscription check succeeding to match the request to an active session, a multicasting session message comprising an identifier for active multicasting/broadcasting session information, wherein generating multicasting/broadcasting session information for the data may further comprise updating multicasting/broadcasting session information for data to be multicast to the at least one user equipment based on the active multicasting/broadcasting session information.

Generating multicasting/broadcasting session information for the data may further comprise generating multicasting/broadcasting session information for the data comprising at least one of: a packet data unit session identifier; at least one internet protocol multicast address; at least one internet protocol source address; and tunnel end-point information.

According to a sixth aspect there is provided a method comprising: receiving a message from at least one user plane function notifying a request from at least one user equipment to join a multicasting/broadcasting group; performing a subscription check on the request to determine whether the request matches an active session; transmitting, based on the subscription check failing to match the request to an active session, a multicasting session creation message to the at least one user plane function, such that the user plane function is caused to generate multicasting/broadcasting session information for data to be multicast to the at least one user equipment.

Transmitting, based on the subscription check failing to match the request to an active session, a multicasting session creation message to the at least one user plane function may further comprise transmitting information comprising at least one of: packet detection rules; packet enforcement rules; packet reporting rules; packet quality of service rules; and packet charging rules, for the user plane function to implement with respect to the multicasting/broadcasting session.

The method may further comprise transmitting, based on the subscription check succeeding to match the request to an active session, a multicasting session message to the at least one user plane function, such that the user plane function identifies the active multicasting/broadcasting session information for data to be multicast to the at least one user equipment.

The method may further comprise: transmitting a network management message associated with the multicast session, the network management message may comprise at least one of: session management information to be forwarded at an access and mobility management function to the at least one access network node and the at least one user equipment.

Transmitting a network management message associated with the multicast session may further comprise transmitting at least one of: a cause value; session management information for an interface between a session management function and an access network node, the session management information for an interface between the session management function and an access network node comprising at least one of: a multicast packet data unit identifier, a session identifier, at least one quality of service profile, core network tunnel information, a single network slice selection assistance information, and session-AMBR information; session management information for an interface between the at least one user equipment and a session management function, the session management information for an interface between the at least one user equipment and a session management function comprising at least one of the a multicast packet data unit identifier, a session identifier, at least one quality of service profile, and session-AMBR information.

The method may further comprise receiving, from the at least one user plane function, generated multicasting/broadcasting session creation information and which is used to generate the network management message associated with the multicast session.

The method may be implemented by a session management function within a 5G/NR network.

According to a seventh aspect there is provided a method comprising: receiving from an access and mobility management function a multicast session creation request message; receiving from a user plane function data for multicasting/broadcasting from a data network; selecting for the data a set of radio bearers based on an availability of measurements and reported quantities in the measurements from at least one user equipment; and transmitting using the set of radio bearers the data for multicasting/broadcasting to the at least one user equipment, the at least one user equipment having requested to join a multicasting/broadcasting group associated with the data for multicasting/broadcasting.

Receiving the multicast session request message may further comprise receiving within the multicast session request message information associating at least one user equipment with the multicast session request.

Selecting for the data a set of radio bearers based on an availability of the measurements and reported quantities in the measurements from the at least one user equipment may further comprise: receiving from the at least one user equipment the measurements of at least one parameter of: a received signal strength indicator—RSSI; a reference signal received power—RSRP; a reference signal received quality—RSRQ; a block error rate—BLER, and beam information, location information and time information; and selecting at least one multicast radio bearer and/or at least one unicast radio bearer based on the at least one parameter.

Selecting for the data a set of radio bearers based on the availability of measurements and reported quantities in the measurements from at least one user equipment may further comprise selecting at least one multicast bearer where no measurements are available.

Selecting for the data a set of radio bearers based on the availability of measurements and reported quantities in the measurements from at least one user equipment may further comprise selecting at least one unicast bearer for the at least one user equipment where the measurements indicate a worse radio condition.

The method may further comprise selecting for the data the set of radio bearers further based on a determination of the type of data for multicasting/broadcasting to the at least one user equipment.

The method may be implemented in at least one of: a gNB; and a relay node operating within a 5G/NR radio access network.

Receiving from an access and mobility management function a multicast session creation request message may further comprise receiving information comprising at least one of: packet detection rules; packet enforcement rules; packet reporting rules; packet quality of service rules; and packet charging rules, for the apparatus to implement with respect to the multicasting/broadcasting session.

According to an eighth aspect there is provided a method comprising: transmitting a message from at least one user equipment requesting to join a multicasting/broadcasting group; and receiving from an access point via at least one of a selected unicast bearer or a multicast bearer data for multicasting/broadcasting from a data network associated with the multicasting/broadcasting group.

The method may further comprise: measuring at least one parameter of: a received signal strength indicator—RSSI; a reference signal received power—RSRP; a reference signal received quality—RSRQ; a block error rate—BLER; beam information; location information; and time information; and transmitting the at least one parameter to at least one access point of a radio access network, wherein the at least one parameter is caused to enable the at least one access point to select the at least one of the unicast or multicast bearer.

Transmitting a message from at least one user equipment requesting to join a multicasting/broadcasting group may further comprise transmitting a message comprising at least one of: at least one internet protocol multicast address; and at least one internet protocol source address.

The method may further comprise: receiving a session management information; and determining, based on the received session management information, whether to repeat the request to join a multicast/broadcast group or not to repeat the request to join a multicast/broadcast group.

According to a ninth aspect there is provided an apparatus comprising: means for receiving a message from at least one user equipment requesting to join a multicasting/broadcasting group; means for receiving data for multicasting/broadcasting from a data network; generating multicasting/broadcasting session information for the data; routing the data based on the multicasting/broadcasting session to at least one access point, wherein the access point wirelessly communicates the data to user equipment based on the multicasting/broadcasting session information.

The apparatus may be a user plane function within a 5G/NR network.

The apparatus may further comprise: means for generating a multicast session notification message to a session management function based on the message from the at least one user equipment; means for receiving a multicast session creation request from the session management function based on the multicast session notification message; and means for creating and acknowledging the creation of a multicast session based on the multicast session creation request.

The means for generating a multicast session notification message to a session management function based on the message from the at least one user equipment may further comprise means for generating a multicast session notification message comprising at least one of: a packet data unit session identifier configured to indicate the session on which the message from at least one user equipment was received and for identifying the at least one user equipment; at least one internet protocol multicast address; at least one internet protocol source address; and tunnel end-point information.

The means for routing the data based on the multicasting/broadcasting session to at least one access point, wherein the access point wirelessly communicates the data to user equipment based on the multicasting/broadcasting session information may further comprise means for implementing a multicasting routing protocol to route the data from the data network to the at least one access point.

The means for receiving a message from at least one user equipment requesting to join a multicasting/broadcasting group may further comprise means for receiving a message comprising at least one of: at least one internet protocol multicast address; and at least one internet protocol source address.

The apparatus may further comprise: means for transmitting a message to at least one session management function notifying the session management function of the request from the at least one user equipment to join the multicasting/broadcasting group and to perform a subscription check on the request to determine whether the request matches an active session; and means for receiving, based on the subscription check failing to match the request to an active session, a multicasting session creation message, wherein the means for generating multicasting/broadcasting session information for the data may further comprise means for generating multicasting/broadcasting session information for data to be multicast to the at least one user equipment based on the multicasting session creation message.

The apparatus may further comprise means for receiving, based on the subscription check succeeding to match the request to an active session, a multicasting session message comprising an identifier for active multicasting/broadcasting session information, wherein means for generating multicasting/broadcasting session information for the data may further comprise means for updating multicasting/broadcasting session information for data to be multicast to the at least one user equipment based on the active multicasting/broadcasting session information.

The means for generating multicasting/broadcasting session information for the data may further comprise means for generating multicasting/broadcasting session information for the data comprising at least one of: a packet data unit session identifier; at least one internet protocol multicast address; at least one internet protocol source address; and tunnel end-point information.

According to a tenth aspect there is provided an apparatus comprising: means for receiving a message from at least one user plane function notifying the apparatus of a request from at least one user equipment to join a multicasting/broadcasting group; means for performing a subscription check on the request to determine whether the request matches an active session; means for transmitting, based on the subscription check failing to match the request to an active session, a multicasting session creation message to the at least one user plane function, such that the user plane function is caused to generate multicasting/broadcasting session information for data to be multicast to the at least one user equipment.

The means for transmitting, based on the subscription check failing to match the request to an active session, a multicasting session creation message to the at least one user plane function may further comprise means for transmitting information comprising at least one of: packet detection rules; packet enforcement rules; packet reporting rules; packet quality of service rules; and packet charging rules, for the user plane function to implement with respect to the multicasting/broadcasting session.

The apparatus may further comprise means for transmitting, based on the subscription check succeeding to match the request to an active session, a multicasting session message to the at least one user plane function, such that the user plane function identifies the active multicasting/broadcasting session information for data to be multicast to the at least one user equipment.

The apparatus may further comprise: means for transmitting a network management message associated with the multicast session, the network management message may comprise at least one of: session management information to be implemented at an access and mobility management function for controlling the at least one access network node and the at least one user equipment.

The means for transmitting a network management message associated with the multicast session may further comprise means for transmitting at least one of: a cause value; session management information for an interface between the access and mobility management function and an access network node, the session management for an interface between the access and mobility management function and an access network node may comprise at least one of: a multicast packet data unit identifier, a session identifier, at least one quality of service profile, core network tunnel information, a single network slice selection assistance information, and session-AMBR information; session management information of an interface between the at least one user equipment and the access and mobility management function, the session management information of an interface between the at least one user equipment and the access and mobility management function may comprise at least one of the a multicast packet data unit identifier, a session identifier, at least one quality of service profile, and session-AMBR information.

The apparatus may further comprise means for receiving, from the at least one user plane function, generated multicasting/broadcasting session creation information and which is used to generate the network management message associated with the multicast session.

The apparatus may be a session management function within a 5G/NR network.

According to a eleventh aspect there is provided an apparatus comprising: means for receiving from an access and mobility management function a multicast session creation request message; means for receiving from a user plane function data for multicasting/broadcasting from a data network; means for selecting for the data a set of radio bearers based on an availability of measurements and reported quantities in the measurements from at least one user equipment; and means for transmitting using the set of radio bearers the data for multicasting/broadcasting to the at least one user equipment, the at least one user equipment having requested to join a multicasting/broadcasting group associated with the data for multicasting/broadcasting.

The means for receiving the multicast session request message may further comprise means for receiving within the multicast session request message information associating at least one user equipment with the multicast session request.

The means for selecting for the data a set of radio bearers based on an availability of the measurements and reported quantities in the measurements from the at least one user equipment may further comprise: means for receiving from the at least one user equipment the measurements of at least one parameter of: a received signal strength indicator—RSSI; a reference signal received power—RSRP; a reference signal received quality—RSRQ; a block error rate—BLER, and beam information, location information and time information; and means for selecting at least one multicast radio bearer and/or at least one unicast radio bearer based on the at least one parameter.

The means for selecting for the data a set of radio bearers based on the availability of measurements and reported quantities in the measurements from at least one user equipment may further comprise means for selecting at least one multicast bearer where no measurements are available.

The means for selecting for the data a set of radio bearers based on the availability of measurements and reported quantities in the measurements from at least one user equipment may further comprise means for selecting at least one unicast bearer for the at least one user equipment where the measurements indicate a worse radio condition.

The apparatus may further comprise means for selecting for the data the set of radio bearers further based on a determination of the type of data for multicasting/broadcasting to the at least one user equipment.

The apparatus may be at least one of: a gNB; and a relay node operating within a 5G/NR radio access network.

The means for receiving from an access and mobility management function a multicast session creation request message may further comprise means for receiving information comprising at least one of: packet detection rules; packet enforcement rules; packet reporting rules; packet quality of service rules; and packet charging rules, for the apparatus to implement with respect to the multicasting/broadcasting session.

According to an twelfth aspect there is provided an apparatus comprising: means for transmitting a message from at least one user equipment requesting to join a multicasting/broadcasting group; and means for receiving from an access point via at least one of a selected unicast bearer or a multicast bearer data for multicasting/broadcasting from a data network associated with the multicasting/broadcasting group.

The apparatus may further comprise: means for measuring at least one parameter of: a received signal strength indicator—RSSI; a reference signal received power—RSRP; a reference signal received quality—RSRQ; a block error rate—BLER; beam information; location information; and time information; and transmitting the at least one parameter to at least one access point of a radio access network, wherein the at least one parameter is caused to enable the at least one access point to select the at least one of the unicast or multicast bearer.

The means for transmitting a message from at least one user equipment requesting to join a multicasting/broadcasting group may further comprise means for transmitting a message comprising at least one of: at least one internet protocol multicast address; and at least one internet protocol source address.

The apparatus may further comprise: means for receiving a session management information; and determining, based on the received session management information, whether to repeat the request to join a multicast/broadcast group or not to repeat the request to join a multicast/broadcast group.

In another aspect there is provided a computer program embodied on a non-transitory computer-readable storage medium, the computer program comprising program code for providing any of the above methods.

In another aspect there is provided a computer program product for a computer, comprising software code portions for performing the steps of any of the previous methods, when said product is run.

A computer program comprising program code means adapted to perform the method(s) may be provided. The computer program may be stored and/or otherwise embodied by means of a carrier medium.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

The concept as discussed in further detail hereafter focuses on multicast session definition and management in 3GPP 5G architecture.

Before explaining in detail the examples, certain general principles of a wireless communication system and mobile communication devices are briefly explained with reference to FIGS. 1 to 2 to assist in understanding the technology underlying the described examples.

Figure 1:
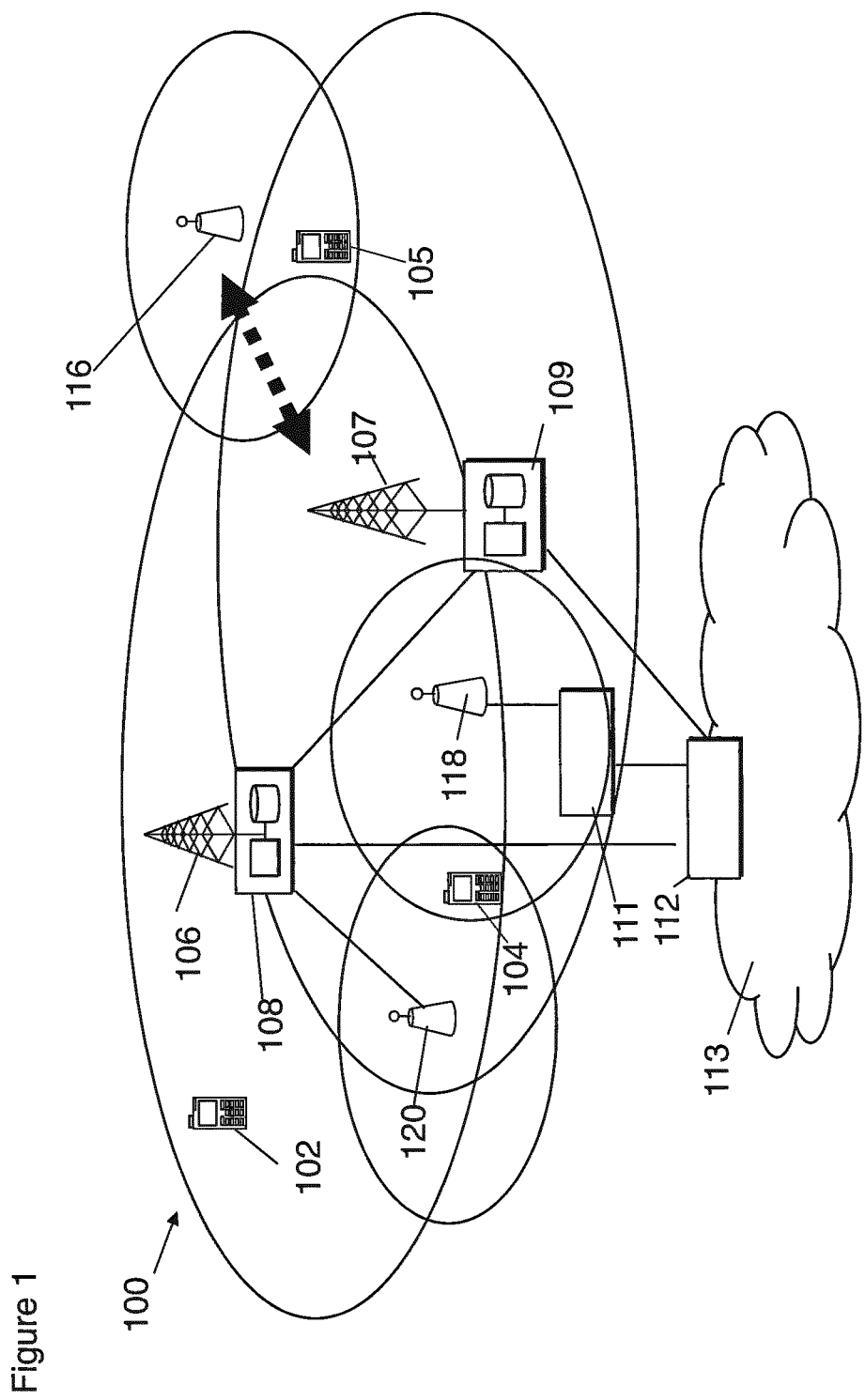
FIG. 1 shows a schematic diagram of an example communication system comprising a plurality of base stations and a plurality of communication devices.

In a wireless communication system 100, such as that shown in FIG. 1, mobile communication devices or user equipment (UE) 102, 104, 105 are provided wireless access via at least one access point or similar wireless transmitting and/or receiving node or point. An access point or base station is referred to as a Node B or generally NB (for example an eNB in LTE and gNB in 5G NR). Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

LTE (and 5G) systems may however be considered to have a so-called "flat" architecture, without the provision of RNCs; rather the NB is in communication with a system architecture evolution gateway (SAE-GW) and a mobility management entity (MME), which entities may also be pooled meaning that a plurality of these nodes may serve a plurality (set) of NBs. Each UE is served by only one MME and/or S-GW at a time and the NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations (or relay nodes or RN) 116, 118 and 120 may also be connected to the network 113, for example by a separate gateway function and/or via the controllers of the macro level stations. The base stations 116, 118 and 120 may be pico or femto level base stations or the like. In the example, station 118 is connected via a gateway 111 whilst station 120 connects via the controller apparatus 108. The station 116 may be connected via station 107 as will be explained in further detail hereafter. In some embodiments, the smaller stations may not be provided.

Figure 2:
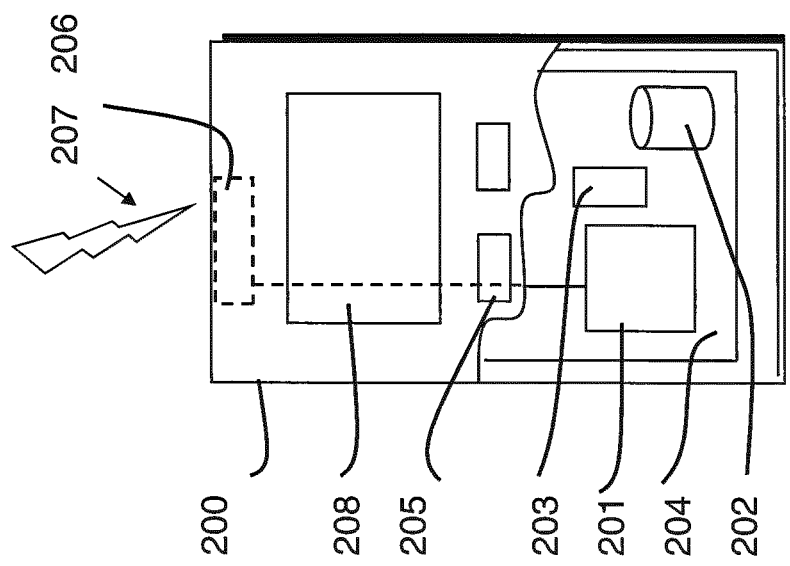
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interlace 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto. The communication devices 102, 104, 105 may access the communication system based on various access techniques.

Figure 3:
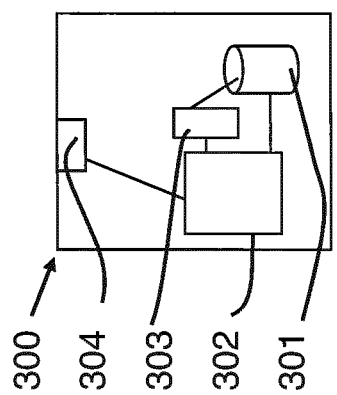
FIG. 3 shows a schematic diagram of an example control apparatus.

An example control apparatus (and/or base station) is shown in FIG. 3. FIG. 3 shows an example of a control apparatus provided in a base station or access point. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 or processor 302/303 can be configured to execute an appropriate software code to provide the control functions.

An example of wireless communication systems are architectures standardized by the 3rd Generation Partnership Project (3GPP). The currently being developed 3GPP based development, release 15, is often referred to as the 5G NR standards part of long term evolution (LTE) or LTE Advanced Pro of the Universal Mobile Telecommunications System (UMTS) radio-access technology. Other examples of radio access system comprise those provided by base stations of systems that are based on technologies such as wireless local area network (WLAN) and/or WiMax (Worldwide Interoperability for Microwave Access).

As discussed earlier one of the aspects of these wireless communications systems is multicast/broadcast operations over cellular networks. With respect to FIG. 4 a known architecture for delivering content using multicast/broadcast in LTE-Advanced networks is shown.

The architecture shows a content provider 401 generating suitable multicast/broadcast content which is forwarded to a broadcast multicast service centre (BMSC) 403 for broadcast/multicast output and to a packet data gateway (P-GW) 405 for unicast output.

The packet data gateway (P-GW) 405 is the link between the mobile device and the services that reside in an external packet network such as the content provider 401. The P-GW 405 may communicate with a serving gateway (S-GW) 407.

The S-GW 407 is the gateway which terminates the interface towards E-UTARN. For each UE at given point of time, there is a single S-GW. The S-GW is further in communication with the eNB 409.

The eNB 409 can receive the content from the S-GW 407 and forward it to the UE 410 over a unicast 402 path.

The architecture further shows a broadcast multicast service centre (BMSC) 403 which is in communication with a multimedia broadcast multicast services-gateway (MBMS-GW) 411.

The MBMS-GW 411 may be in further communication with an eNB 413 for providing a single cell point to multipoint (SC-PTM) link 404 to an UE 420 or a multicast-broadcast single-frequency network (MBSFN) link in MBSFN area when all cells of MBSFN area are controlled by a single eNB.

The MBMS-GW 411 may also be in communication with a series of eNBs 419$_1$, 419$_2$, 419$_3$ which form a multicast-broadcast single-frequency network (MBSFN) area 421 and which communicate to UEs 406 within the MBSFN area the content provided by the content provider.

Also the MBMS-GW 411 may also be in communication with a mobility management entity (MME) 415. The MME deals with the control plane and handles the signalling related to mobility and security for E-UTRAN access. The MME is in communication with a multi-cell/multicast coordination entity (MCE) 417.

The MCE 417 is a functional entity providing functions for admission control and allocation of radio resources by the E-UTRAN and for MBMS session control and is configured to control the eNBs 419$_1$, 419$_2$, 419$_3$ which form a multicast-broadcast single-frequency network (MBSFN) area 421.

Figure 4:
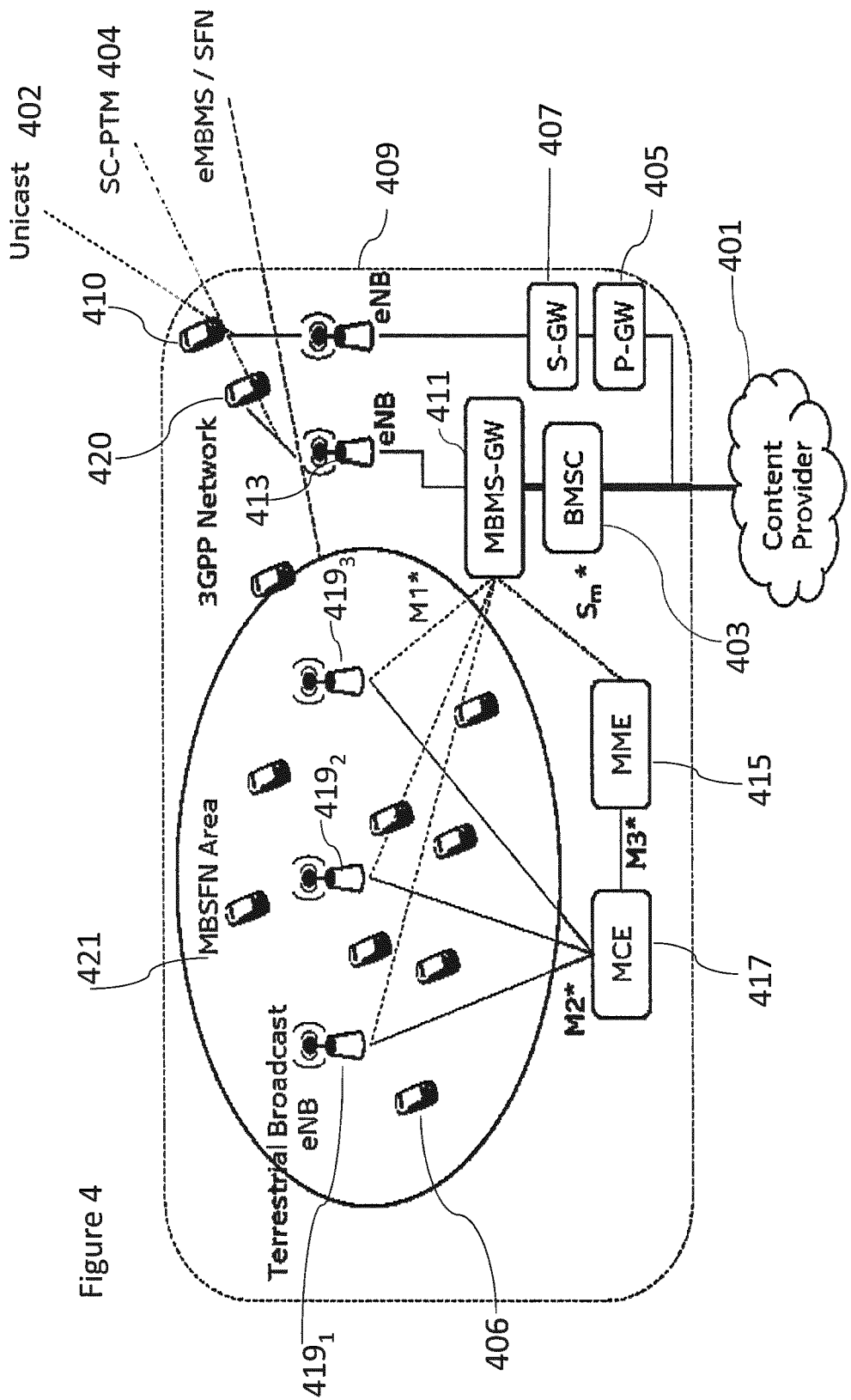
FIG. 4 shows example known multicast/broadcast architecture.

In other words FIG. 4 shows an architecture for the wide-area delivery of content using multicast/broadcast using multicast broadcast single frequency networks (MBSFN) areas where the same content is delivered over the air using synchronized time-frequency physical resources. For delivery of such content to a smaller area, single cell-point-to-multipoint (SC-PTM) technology was developed.

One of the key design principles of content delivery to multiplicity of UEs in 5G is the simple and efficient reuse of unicast architecture, and thus to significantly reduce infrastructure for the delivery of multicast/broadcast content.

Also the implementations described hereafter attempt to improve the traditional MBMS architecture which was designed for the delivery of conventional broadcast content. Linear TV content consumption has been declining and the implementations described hereafter are designed to natively support dynamic delivery of popular content using unicast and multicast capabilities efficiently, and without significant additional infrastructure requirements from the network operators' perspective The MBMS architecture in 3GPP has been an add-on feature which requires new network entities and interfaces and has a terrestrial broadcast of linear TV approach in mind. As discussed above the concept as discussed in the following embodiments is one which aims to better fit new service models such as 'over-the-top' media and internet-of-things (IoT) services. Also the embodiments are able to implement and service the consumption of linear TV. An example use case for these embodiments is therefore the consumption of multimedia feeds during live events by large population of users. With dynamic provisioning of live content through various social media applications, there are emerging trends of 'new media content' that is being increasingly consumed in a linear manner (for e.g., Facebook/Twitter/YouTube Live feature). The embodiments as discussed in further detail later therefore are configured to provide network capability for delivering multicast content efficiently for such use cases.

The concept as expressed in the following embodiments is one of enabling support for multicast/broadcast in 5G with minimal footprint over the unicast architecture and make multicast/broadcast support an integral part of the 5G system. Furthermore the embodiments address multicast session definition and the establishment of multicast sessions.

This implementations as discussed herein, in contrast to eMBMS and its MBMS operation on demand (MooD) architecture, which is used to setup MBMS session based on UEs demand, introduces a new multicast session type in the 3GPP 5G system and proposes an establishment procedure of the multicast session upon an event detection by a user plane function (UPF) in the user plane and/or event detection in the UE.

As such the multicast traffic (e.g. IP multicast packets) is configured to be received by the UPF and the multicast traffic is handled within the multicast session regardless whether there is a single or multiple UEs receiving the multicast traffic within the (R)AN. The RAN is then configured to use a configured set of unicast and multicast bearers to transmit data over the air. The (R)AN is further configured to be responsible for the selection of bearers from the configured set, based on the availability of UE measurements and the reported quantities in the measurements.

It is believed that this approach simplifies the multicast/broadcast procedures and the overhead introduced is marginal.

Figure 5:
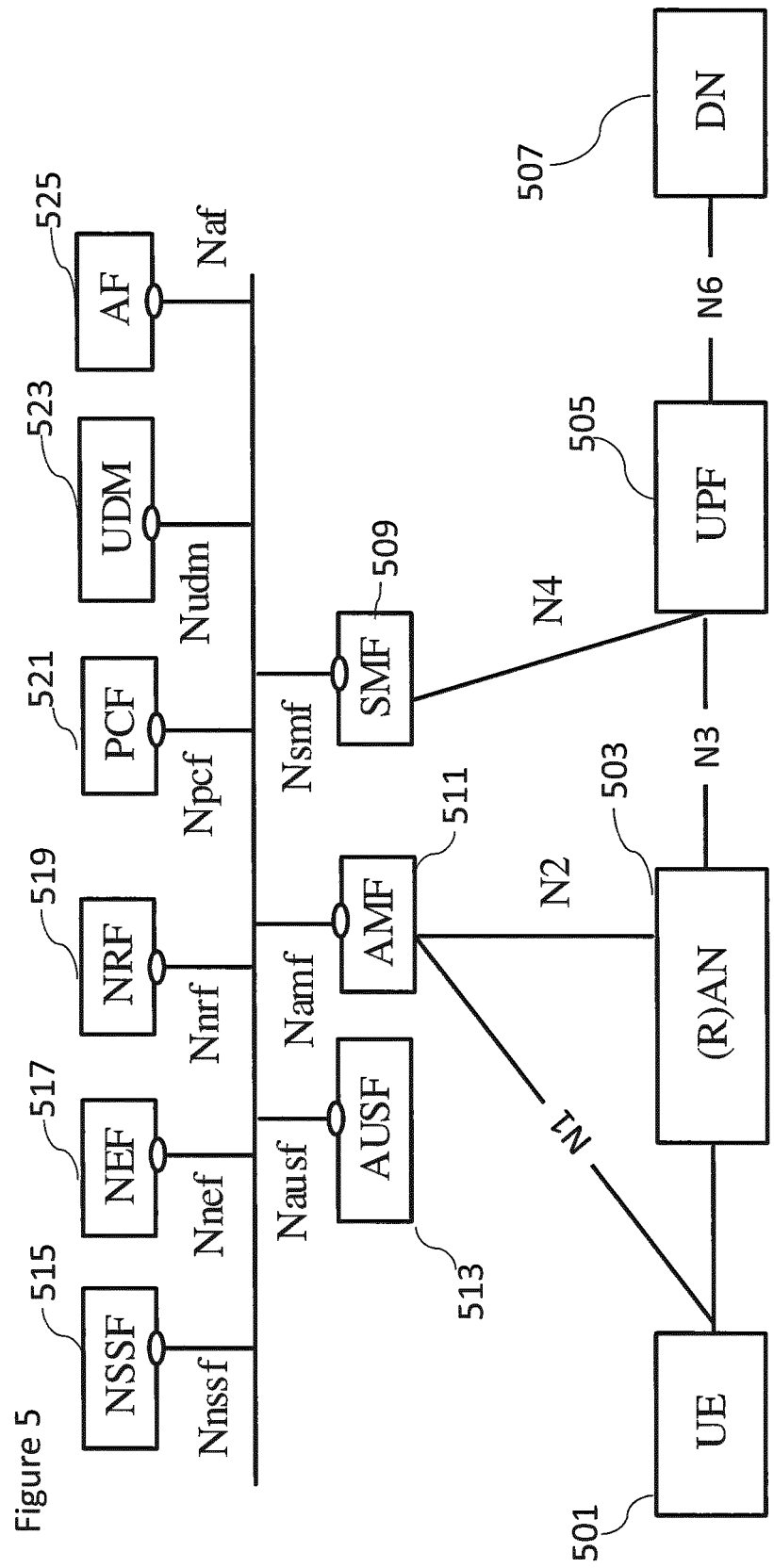
FIG. 5 shows an example 5G NR architecture suitable for implementing some embodiments.

With respect to FIG. 5 a suitable 5G system architecture comprising enhancements to enable content delivery via multicast is shown.

The architecture shows the User Equipment (UE) 501 connected a (radio) access network ((R)AN) 503 at the access stratum, as well as an Access and Mobility Function (AMF) 511 at the non-access stratum. The RAN represents a base station using new RAT and evolved LTE, for example a gNodeB (gNB), while an AN is a general base station including non-3GPP access, e.g., Wi-Fi.

The 5G core network (5GC) consists of various network functions (NFs). In FIG. 5 there are seven 5G core NFs. An access and mobility management function AMF 511, a Session Management Function (SMF) 509, a Policy Control Function (PCF) 521, an Application Function (AF) 525, an Authentication Server Function (AUSF) 513, a User Plane Function (UPF) 505, User Data Management (UDM) 523, a NF Repository Function (NRF) 519, a Network Exposure Function (NEF) 517 and a Network slice selection function (NSSF) 515.

The functionality of these network functions is generally described with respect to 3GPP TS 23.501 and is not discussed in further detail hereafter.

The PDU session anchor UPF 505 (i.e. the UPF interfacing data network at the N6 reference point) is configured to act as the multicast router/switch of a corresponding IP PDU session type. The design principle of the N6 reference point is to introduce multicast IP datagrams in ingress traffic and thus avoid a need for a dedicated interface to receive multicast traffic in a 5G network.

For the IP PDU session type, a UPF handling IP PDU session type is configured to implement Multicast Listener Discovery Version 2 (MLDv2) for IPv6 or Internet Group Management Protocol Version 3 (IGMPv3) depending on the IP version used for PDU session. These protocols are used by the UPF to learn which multicast addresses have UEs (hosts).

The UPF can also be configured to learn which multicast sources it is serving and what multicast addresses (source-specific multicast/SSM and any-source multicast/ASM) are used. This may be determined for example via configuration (e.g. from an application function (AF) 525 using traffic steering framework with possible enhancements) or interaction with multi-access edge cloud (MEC) platform.

The UPF 505 may further be configured to use a multicast routing protocol to ensure that multicast packets are delivered from neighbouring routers and to all listening UEs.

The embodiments as described herein implement a multicast PDU session by modifying a PDU session such as described in TS 23.501 "PDU Session: Association between the UE and a Data Network that provides a PDU connectivity service." The PDU session in TS 23.501 represents a one to one relation between the UE and data network identified by a data network name (DNN) and which is not suitable for multicast.

Therefore according to the following embodiments a new PDU session type is defined and denoted as a multicast PDU session type. In example when the UE is configured to establish a IP PDU session type, the multicast IP PDU session type represents an association between the UEs and a multicast group identified by a source specific multicast or any-source multicast addresses.

In some embodiments the UE triggered multicast IP PDU Session Establishment is implemented through user plane (UP) signalling and employs signalling corresponding to a UE joining a IP multicast group. Thus in some embodiments, in IPv6 examples, a transmission of a multicast listener report is implemented. The multicast IP PDU session establishment loosely follows a UE requested PDU session establishment for non-roaming and roaming with local breakout specified in TS 23.502.

Figure 6:
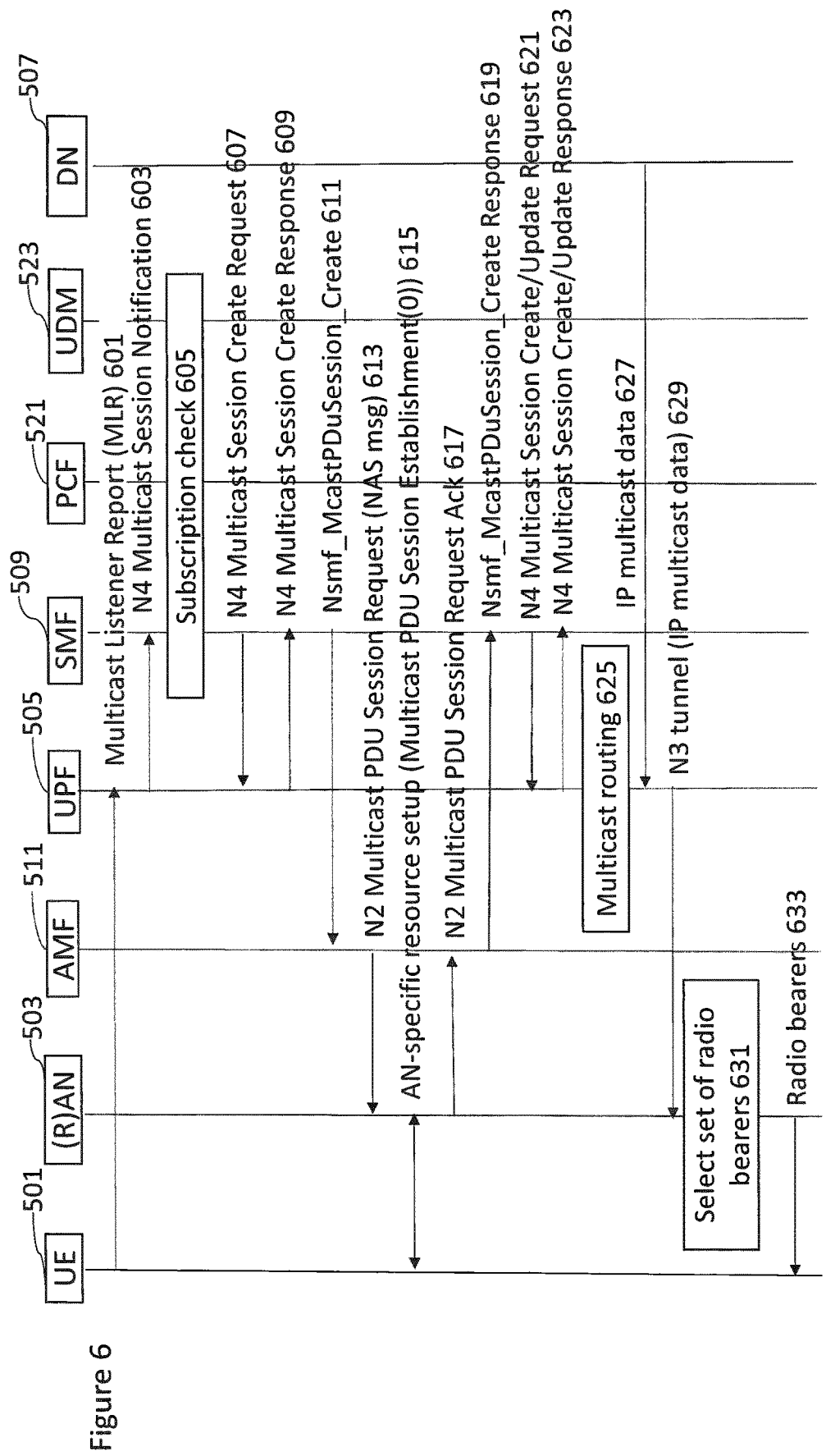
FIG. 6 shows a flowchart of an example method for supporting multicast/broadcast in a 5G NR architecture according to some embodiments.

This for example is shown with respect to FIG. 6 which shows such an example setting up of a multicast IP PDU session.

For example as a first operation, shown in FIG. 6 by step 601, the UE 501 is configured to send to a UPF 505 a Multicast listener report. The multicast listener report in some embodiments comprises IP multicast address(es), and possibly IP source address(es).

Having received the multicast listener report the UPF 505 may be configured to check the content of the multicast listener report against an active multicast IP PDU session list of the UE sending the multicast listener report. If the multicast listener report includes an IP multicast address (source specific multicast—SSM or any source multicast—ASM) for which the UPF 505 does not have a valid multicast IP PDU session, then the UPF 505 is configured to notify the Session Management Function (SMF) 509. The validity check of multicast IP PDU session means that there is a multicast IP PDU session established in UPF and the transmitting UE is associated with this session.

The following flow assumes there is no current multicast IP PDU session established at UPF.

Thus as shown in FIG. 6 step 603, the UPF 505 transmits to the SMF 509 a Multicast session notification. The multicast session notification may comprise a PDU Session ID, IP multicast address(es), (and optionally IP source address(es)), and tunnel end-point information.

The PDU Session ID in some embodiments indicates the session on which the multicast listener report was received. The SMF 509 can use the PDU session ID to identify the UE 501.

The tunnel end-point information in some embodiments may already have been provided in this step.

The SMF 509 in some embodiments can be configured to generate a multicast PDU session ID to alias the IP multicast address. The multicast PDU session ID in some embodiments is the same for all UEs sharing the same UPF 505.

In some embodiments the SMF 509 is already registered with Unified Data Management (UDM) 523 because the SMF 509 had previously done so during the PDU session establishment. The SMF 509 in some embodiments is also notified by the UDM 523 where the subscription information changes.

The subscription check is shown in FIG. 6 by step 605.

A default 5G quality of service indicator (5QI) and/or allocation and retention priority (ARP) and subscribed session aggregate maximum bit rate (session-AMRB) could be derived from subscription information of all UEs associated with the multicast IP PDU session.

In some embodiments the content provider is configured to provide subscription/service level parameters for the multicast IP PDU sessions. The application function influence on traffic routing, such as described in section 4.3.6 of 3GPP technical standard TS 23.501, could be used. In such embodiments the application function (AF) traffic steering request can be targeted to an IP UE address as currently specified. For the multicast IP PDU session, the request can be configured to target an IP multicast address. The SMF 509 may in some embodiments be configured to communicate with a Policy Control Function (PCF) 521 to get default policy control and charging (PCC) rules for the multicast PDU session. The procedure of provisioning subscription/service level parameters for the multicast sessions can be involved before step 601.

It is understood that this is an example of how to provide 5G QoS Identifier (5QI)/Allocation and Retention Priority (ARP) for multicast PDU session information and there may be implemented other methods to provide the same information.

In some embodiments the SMF 509 transmits to the UPF 505 (over the N4 interface) a Multicast Session Create Request as shown in FIG. 6 by step 607.

If the interface between the (R)AN 503 and UPF 505 (the N3 interface) is using point-to-point tunnelling, and the UPF 505 has allocated (N3) tunnel information, and the information was included in the (N4) Multicast Session Notification, then the multicast IP PDU session can be created according to steps 621 and 623 instead of steps 607 and 609.

The SMF 509 may be configured to provide within the multicast session create request message packet detection, enforcement and reporting (e.g. for charging) rules to be installed on the UPF 505 for the session.

In response to the multicast session create request message the UPF 505 transmits to the SMF 509 (over the N4 interface) a Multicast Session Create Response message as shown in FIG. 6 by step 609. The UPF, in the Multicast Session Create Response message, is configured to acknowledge the creation of the session. In some embodiments where the interface between the (R)AN 503 and UPF 505 (N3) tunnel information is allocated by the UPF 505 and the information was not provided in the earlier step 603, the N3 tunnel information is provided to SMF 509 in the Multicast Session Create Response message.

In some embodiments the SMF 509 is further configured to transmit to the AMF 511 a network (slicing) management based message associated with the PDU session creation request, which may be denoted a Nsmf_McastPDUSession_CreateRequest message. The Nsmf_McastPDUSession_CreateRequest message may comprise a Cause value. The message may also comprise N2 interface (the interface between the (R)AN 503 and the AMF 511) session management (SM) information such as multicast PDU Session ID, QoS profile(s) information, core network (CN) (N3) Tunnel information, single network slice selection assistance information (S-NSSAI), and session-AMBR information. The message may also comprise UE 501 and AMF 511 (N1) interface session management information such as a Multicast PDU session establishment information. The Multicast PDU session establishment information itself may comprise the Multicast PDU session ID, QoS rules, and session-AMBR information. The transmitting from the SMF 509 to the AMF 511 a network (slicing) management based message associated with the PDU session creation request, which may be denoted a Nsmf_McastPDUSession_CreateRequest message is shown in FIG. 6 by step 611.

The SMF 509 in some embodiments is configured to subscribe to the UE location reporting (e.g. UE location with respect to the service area).

The N1 SM container, which contains the SM message for UE in some embodiments is optional or may not be needed at all. In some embodiments the QoS Rule associated with the uplink traffic is used and as such not needed in unidirectional multicast transport.

In some embodiments the AMF 511 is further configured to forward information received from SFM 509 to the (R)AN 503 in the N2 SM Tunnel information container. This forwarded information comprises at least: the CN (N3) tunnel information; the QoS profile; and the multicast PDU session ID.

Furthermore in some embodiments the AMF 511 is configured to transmit to the (R)AN 503 a (N2) Multicast PDU Session Request as shown in FIG. 6 by step 613. The multicast PDU session request may comprise N2 SM information, and non-access stratum (NAS) message information. The NAS message information may itself comprise a Multicast PDU session ID, a UE 501 and AMF 511 (N1) SM container which itself comprises Multicast PDU Session Establishment information. In some embodiments the access stratum (radio) configuration messages are sufficient and the NAS message may not be needed, i.e. UE does not need to manage multicast PDU session context.

Having received the multicast PDU session request message the (R)AN configures radio access resources (a set of unicast and multicast bearers) for communications to the UEs 501, as shown in FIG. 6 by the AN-specific resource setup Multicast PDU Session Establishment(0) messages 615 between the (R)AN 503 and the UE 501.

Where point-to-point tunnelling on the CN (N3) tunnel is used, the (R)AN 503 is configured to allocate (R)AN N3 tunnel information for the multicast PDU Session.

Furthermore where point-to-multipoint tunnelling is used on the N3 such as eMBMS M1, the (R)AN joins the IP multicast group based on the information received in the N2 SM Tunnel information.

Having setup the AN specific resources the (R)AN 503 is configured to transmit to the AMF 511 a N2 PDU Session Request Ack message such as shown in FIG. 6 by step 617. The Ack message in some embodiments comprises information such as the Multicast PDU Session ID, the Cause, and the N2 SM information. The N2 SM information may further comprise the Multicast PDU Session ID, (R)AN CN (N3) tunnel info, and accepted/rejected QoS profile(s).

If point-to-point tunnelling is used on the CN (N3) interface then the (R)AN 503 is configured to provide the CN (N3) tunnel information corresponding to the session.

If point-to-multipoint tunnel is used on the CN (N3) reference point then no CN (N3) tunnel information needs to be provided from the (R)AN 503.

The following operation is one where the AMF 511 is configured to transmit to the SMF 509 a network (slicing) management based message associated with the PDU session creation response as shown in FIG. 6 by step 619 and which may be denoted a Nsmf_McastPDUSession_Create_Response message. The AMF thus in this message may forward the N2 SM information to the SMF.

The SMF 509 may then be configured to transmit to the UPF 505 a N4 Multicast Session Create/Update Request as shown in FIG. 6 by step 621. If the multicast session was created in steps 607 and 609 and the CN (N3) tunnel is a point-to-point tunnel, the session is updated with the tunnel information received in the N2 SM information. If the multicast session was not created in steps 607 and 609, then the session is created with the information described in steps 607 and 609 and the CN (N3) tunnel information.

If the NC (N3) tunnel is a point-to-multipoint tunnel, then the session does not need to be updated and steps 621 and 623 are optional.

In some embodiments the UPF 505 is then configured to transmit to the SMF 509 a N4 Multicast Session Create/Update Response message as shown in FIG. 6 by step 623. The UPF is therefore configured to acknowledge the successful creation or update of the session to the SMF.

The UPF is then configured, using a multicast routing protocol (e.g. PIM), to initialise the routing of multicast packets from the content provider in data network 507 such as shown in FIG. 6 by step 625.

The next operation is one of transmitting from the DN 507 to the UPF 505 (or receiving at the UPF 505 from the DN 507) the User data for multicasting as shown in FIG. 6 by step 627. The UPF 505 is configured in some embodiments to receive IP multicast packets for the multicast IP PDU session.

The UPF 505 is then configured to forward the user data to the (R)AN 503 as shown in FIG. 6 by step 629. The IP multicast packets are sent to (R)AN through the CN (N3) tunnel.

The (R)AN is then configured to select the set of radio bearers to transmit the user data over the air using unicast and/or multicast bearers as shown in FIG. 6 by step 631.

The (R)AN 503 is then configured to transmit the user data over the air using the selected at least one radio bearer as shown in FIG. 6 by step 633.

In some embodiments the multicast listener report may include only changes in source addresses. In this case, the UPF is configured to handle the information locally. In other words the information is used in multicast routing protocol used by UPF.

In some embodiments the multicast session ID can be allocated by either UPF or SMF.

In some embodiments, the selection of radio bearers as shown in FIG. 6 by step 631 is based on the availability of UE measurements and the reported quantities in the measurements, such as RSSI, RSRP, RSRQ or BLER. For example, if measurements are not available, (R)AN uses multicast bearers. In another example where the reported qualities indicate a potential poor radio condition for some UEs in comparison to others, the (R)AN is configured to select unicast bearers for some UEs and multicast bearers for other UEs. For communication links using beam forming, the measurement reports may be received on a beam level, in which case, the (R)AN may also utilize reported beam information in the selection process of the radio bearer. The measurement reports can contain location and time information associated with the radio measurements which in turn can be used in the selection process. The selection profile can in some embodiments depend on the QoS profile of the traffic, and the network can in some embodiments schedule traffic over multicast/broadcast (for traditional broadcast services). The network in some embodiments can be configured to prioritize unicast over multicast for high-quality immersive content type of traffic if there are available radio resources and sufficient quality links to each UE subscribing to the traffic.

In implementing the embodiments as described herein by using the user plane event in the triggering of the multicast PDU session establishment then it is possible to minimize or remove entirely the need for eMBMS middleware, which would be very significant simplification of the network architecture. Furthermore in the implementations as described herein the switching between unicast and multicast can be performed at the transport layer using HTTP2 over multicast QUIC, which is transparent to HTTP application, or at the application layer. Additionally the embodiments may provide a simple and efficient mechanism to deliver multicast content, with minimal overhead over the unicast architecture.

It should be understood that each block of the flowchart of the Figures and any combination thereof may be implemented by various means or their combinations, such as hardware, software, firmware, one or more processors and/or circuitry.

It is noted that whilst embodiments have been described in relation to one example of a licensed spectrum network, similar principles maybe applied in relation to other examples of networks. It should be noted that other embodiments may be based on other cellular technology other than LTE or on variants of LTE. For example, some embodiments may be used with so-called 5G New Radio or MulteFire. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising
at least one processor and
at least one memory including computer code for one or more programs,
the at least one memory and the computer code configured, with the at least one processor, to cause the apparatus at least to:
receive a message from at least one user equipment requesting to join a multicasting/broadcasting group, wherein the apparatus comprises or is comprised in a core network node including a user plane function, wherein the core network node including the user plane function is configured to interface a data network;
receive data for multicasting/broadcasting from the data network;
generate multicasting/broadcasting session information for the data;
route, based on the multicasting/broadcasting session information, the data to at least one access point, such that the at least one access point can wirelessly communicate the data to the at least one user equipment based on the multicasting/broadcasting session information.

2. The apparatus as claimed in claim 1,
wherein the apparatus is further caused to generate a multicast session notification message to a session management function based on the message from the at least one user equipment, and wherein the multicast session notification message comprising at least one of:
 a packet data unit session identifier configured to indicate a session on which the message from at least one user equipment was received and for identifying the at least one user equipment,
 at least one internet protocol multicast address,
 at least one internet protocol source address, or
 tunnel end-point information.

3. The apparatus as claimed in claim 1,
wherein the apparatus caused to receive the message from at least one user equipment requesting to join the multicasting/broadcasting group is caused to receive the message comprising at least one of:
at least one internet protocol multicast address, or
at least one internet protocol source address.

4. The apparatus as claimed in claim 1,
wherein the apparatus is further caused to:
transmit a message to at least one session management function notifying the session management function of the requesting from the at least one user equipment to join the multicasting/broadcasting group and to perform a subscription check to determine whether the requesting to join matches an active session; and
receive, based on the subscription check failing to match the requesting to join to an active session, a multicasting session creation message, wherein the apparatus caused to generate multicasting/broadcasting session information for the data is caused to generate multicasting/broadcasting session information for data to be multicast to the at least one user equipment based on the multicasting session creation message.

5. The apparatus as claimed in claim 4,
wherein the apparatus is further caused to:
receive, based on the subscription check succeeding to match the requesting to join to an active session, a multicasting session message comprising an identifier for active multicasting/broadcasting session information,
wherein the apparatus caused to generate multicasting/broadcasting session information for the data is caused to update multicasting/broadcasting session information for data to be multicast to the at least one user equipment based on the active multicasting/broadcasting session information.

6. The apparatus as claimed in claim 1,
wherein the apparatus caused to generate multicasting/broadcasting session information for the data is further caused to generate multicasting/broadcasting session information for the data comprising at least one of:
a packet data unit session identifier,
at least one internet protocol multicast address,
at least one internet protocol source address, or
tunnel end-point information.

7. A method comprising:
receiving, by a core network node including a user plane function, a message from at least one user equipment requesting to join a multicasting/broadcasting group, wherein the core network node including the user plane function is configured to interface a data network;
receiving, by the core network node including the user plane function, data for multicasting/broadcasting from the data network;
generating, by the core network node including the user plane function, multicasting/broadcasting session information for the data;
routing, by the core network node including the user plane function, the data to at least one access point, wherein the routing is based on the multicasting/broadcasting session information, such that the at least one access point can wirelessly communicate the data to the at least one user equipment based on the multicasting/broadcasting session information.

8. The method as claimed in claim 7, further comprising:
generating a multicast session notification message to a session management function based on the message from the at least one user equipment;
receiving a multicast session creation request from the session management function based on the multicast session notification message; and
creating and acknowledging the creating of a multicast session based on the multicast session creation request.

9. The method as claimed in claim 8,
wherein generating the multicast session notification message to the session management function based on the message from the at least one user equipment further comprises generating the multicast session notification message comprising at least one of:
a packet data unit session identifier configured to indicate a session on which the message from at least one user equipment was received and for identifying the at least one user equipment,
at least one internet protocol multicast address,
at least one internet protocol source address, or
tunnel end-point information.

10. The method as claimed in claim 7,
wherein routing the data based on the multicasting/broadcasting session information to at least one access point, further comprises implementing a multicasting routing protocol to route the data from the data network to the at least one access point.

11. The method as claimed in claim 7,
wherein receiving the message from at least one user equipment requesting to join the multicasting/broadcasting group further comprises receiving a message comprising at least one of:
at least one internet protocol multicast address, or
at least one internet protocol source address.

12. The method as claimed claim 7, further comprising:
transmitting a message to at least one session management function notifying the session management function of the requesting to join from the at least one user equipment to join the multicasting/broadcasting group and to perform a subscription check on the request to determine whether the requesting to join matches an active session; and
receiving, based on the subscription check failing to match the requesting to join to an active session, a multicasting session creation message, wherein generating multicasting/broadcasting session information for the data further comprises generating multicasting/broadcasting session information for data to be multicast to the at least one user equipment based on the multicasting session creation message.

13. The method as claimed in claim 12, further comprising
receiving, based on the subscription check succeeding to match the requesting to join to an active session, a multicasting session message comprising an identifier for active multicasting/broadcasting session information, wherein generating multicasting/broadcasting session information for the data further comprises updating multicasting/broadcasting session information for data to be multicast to the at least one user equipment based on the active multicasting/broadcasting session information.

14. The method as claimed in claim 7,
wherein generating multicasting/broadcasting session information for the data further comprising generating multicasting/broadcasting session information for the data comprising at least one of:
a packet data unit session identifier,
at least one internet protocol multicast address,
at least one internet protocol source address, or
tunnel end-point information.

15. The apparatus as claimed in claim 1,
wherein the user plane function is configured to interface the data network at an N6 reference point.

16. The apparatus as claimed in claim 1,
wherein the apparatus is further caused to generate, based on the message received from the at least one user equipment, a multicast session notification message to a session management function to enable creation, by the user plane function, of a multicasting/broadcasting session for the at least one user equipment.

17. The method as claimed in claim 7,
wherein an establishment procedure of a multicasting/broadcasting session for the at least one user equipment is based on an event detection by the user plane function.

* * * * *